April 10, 1934.  J. G. JACKSON  1,953,935
NESTING ATTACHMENT FOR PAN SETS
Filed June 15, 1931
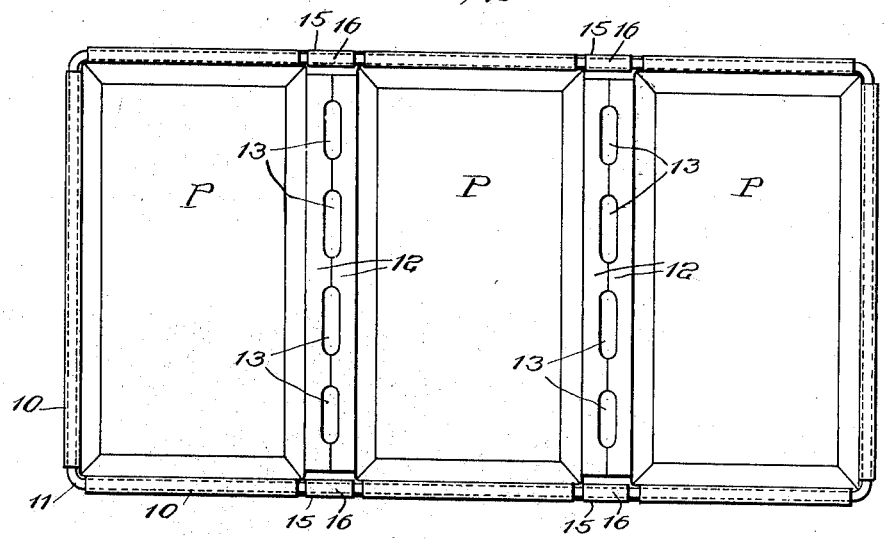
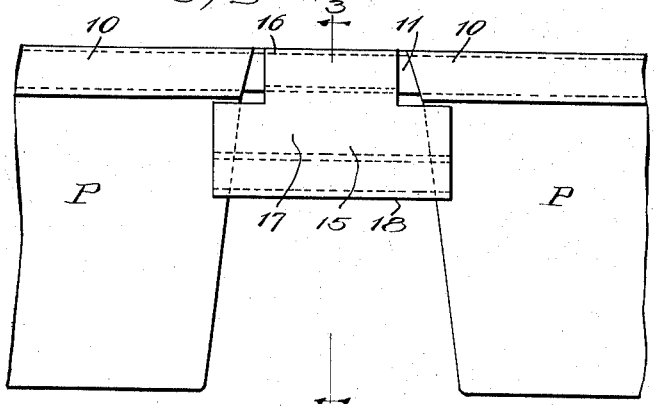
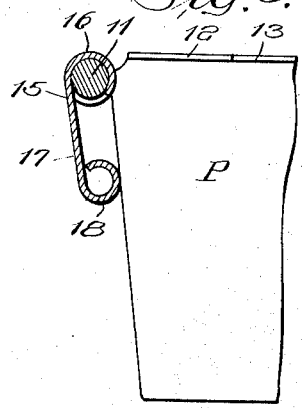
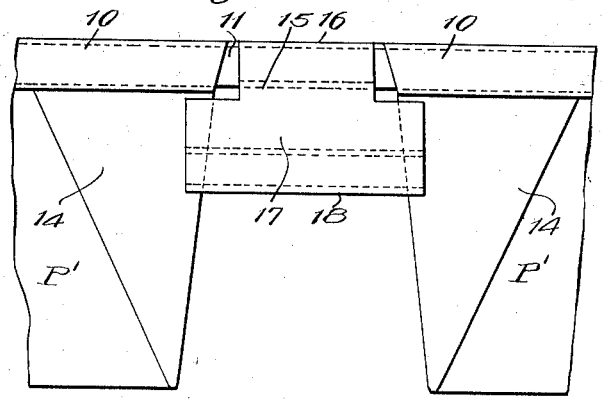
Witness:
William P. Kilroy
Inventor:
Joseph G. Jackson
Charles S. Wilson
Atty.

Patented Apr. 10, 1934

1,953,935

UNITED STATES PATENT OFFICE 1,953,935

NESTING ATTACHMENT FOR PAN SETS

Joseph G. Jackson, Oak Park, Ill., assignor to Edward Katzinger Company, Chicago, Ill., a corporation of Illinois Application June 15, 1931, Serial No. 544,316

6 Claims. (Cl. 53—6)

This invention relates to pan sets and is designed to provide a nesting attachment therefor which will materially lower the nesting line of the set, without in any manner altering the structure of the pans or pan set.

With the above and other objects in view, as will be apparent, this invention consists in the construction, combination and arrangement of parts, all as hereinafter more fully described, claimed and illustrated in the accompanying drawing, wherein:—

Fig. 1 is a plan view of a pan set having the present attachment thereon;

Fig. 2 is an enlarged end elevation of parts of adjoining pans illustrating the coaction therewith of the present nesting attachment;

Fig. 3 is a vertical section taken along line 3—3 of Fig. 3; and

Fig. 4 is a view similar to Fig. 2, illustrating the present invention coacting with folded pans.

The present invention is designed primarily to lower the nesting line of pan sets so that when the pan sets are nested for storage purposes there is ample space between the pan sets of the stack to permit air circulation between the pans for cooling and at the same time there will be no jamming or sticking of the pans so nested.

Heretofore it has been customary to incorporate in the pan set a strapping iron encircling the pans below the beads of the individual pans, the lower edge of which would constitute the nesting line of the pan set. It has also been customary at times to distort exposed ends of the pans to create projections, or to attach plates or other means to the ends of the pans which included projections that created a nesting line below the beads at the edges of the pan walls. These last attachments or plates, as well as the straps frequently were held in place by rivets or other means piercing the pan walls thereby creating objectionable conditions.

The present invention is designed for coaction with the pan set which does not incorporate or use strapping for securing the pans together and in which the individual pans are held together by a wire or similar element encircling the upper edges of the pan walls and attached to the pan walls by having the edges thereof bent over to encircle and engage said wire thereby attaching the pans to the wire and at the same time creating beads at the edges of the exposed pan walls. The present invention is designed to eliminate any distortion of the ends or exposed walls of the pans or the necessity of providing an attachment to the pan or pan walls. Thus the piercing of the pan walls with rivets is eliminated.

Reference being had more particularly to the drawing, P designates a plurality of single pans, each provided with a lip or flange 10 at the upper edge of each of the exposed walls thereof, and arranged side by side in spaced parallel relation. A wire 11 encircles the upper edges of the pans so arranged in the set and is engaged by the lips or flanges 10 formed at the upper edges of the outer walls of the pans P. The lips or flanges 10 of the pans are bent to completely encircle or engage the wire 11, which not only secures the pans together in parallel relation to create a pan set, but also establishes an outstanding bead at the upper edge of each exposed pan wall.

The adjoining walls of adjacent pans are provided with additional flanges 12 which abut at their edges and are perforated with openings 13 through which air may circulate. Thus a pan set is created which comprises a series of pans P bound together in a set by the engagement of the lips or flanges 10 thereof, with a wire 11 encircling the entire pan set. Those portions of the wire 11 which are located at the ends of the spaces between the pans of the set are exposed, not being covered by any portions of the pans.

The construction is the same in the use of folded pans as illustrated in Fig. 4, where the flanges 10 of the pans P' engage the wire 11, the end or corner folds 14 of the pans being engaged under the bead created by the wire 11 and the lips or flanges 10 of the pan walls.

The present invention comprises a plate 15 of a width approximating the width of the exposed portions of the wire 11 at the ends of the spaces between the pans P of the set. At its upper end this plate 15 is bent as at 16 to closely and intimately engage the exposed portion of the wire 11. At the lower end of the plate is a transverse or lateral extension 17 of such length that when the end 16 of the plate engages the wire 11, the extension 17 will project over the ends of the adjoining pans P at each end thereof. The lower edge of the extension 17 is curved or bent inwardly as at 18, reinforcing the attachment, and increasing the bearing surface at the lower edge thereof as well as providing an enlarged portion which will position the body of the attachment substantially parallel of the exposed end walls of the pan.

One of these attachments may be provided for each exposed portion of the wire 11 at the ends of the spaces between the pans P so that a nesting line is created entirely around the pan set in a plane through the beads 18 at the lower ends of the plates 15.

It will be observed that the present attachment in effect constitutes a plate having a bead at each end thereof, the upper bead engaging the wire of the pan and the lower bead, of approximately the same size, extending over and bearing against the end walls of the adjacent pans P. The lower bead 18 is of a size sufficient to position the plate 15 approximately parallel to the end walls of the pan and at the same time provide a surface to bear upon the lips of an adjoining pan set into which it is nested.

What is claimed is:

1. The combination with a plurality of baking pans arranged in spaced parallel relation and having flanges formed at the edges of the outer walls thereof, of a wire encircling all of said pans and engaged by the flanges aforesaid whereby those portions of the wire corresponding to the spaces between the pans remain uncovered, and a plate secured to an exposed portion of the wire at one end and having a lateral extension at the opposite end bearing against the adjoining pan walls.

2. The combination with a plurality of baking pans arranged in spaced parallel relation and having flanges formed at the edges of the outer walls thereof, of a wire encircling all of said pans and engaged by the flanges aforesaid whereby those portions of the wire corresponding to the spaces between the pans remain uncovered, and a plate engaging an exposed portion of the wire at one end and having a lateral extension at the other end extending over the adjacent walls of adjoining pans and having its outer edge bent inwardly to bear against said walls.

3. The combination with a plurality of baking pans arranged in spaced parallel relation and having flanges formed at the edges of the outer walls thereof, of a wire encircling all of said pans and engaged by the flanges aforesaid whereby those portions of the wire corresponding to the spaces between the pans remain uncovered, and a plate engaging an exposed portion of the wire at one end and having a lateral extension at the other end extending over the adjacent walls of adjoining pans and having its outer edge bent inwardly to bear against said walls and hold the plate in a plane substantially parallel to said walls.

4. The combination with a plurality of making pans arranged in spaced parallel relation and having flanges formed at the edges of the outer walls thereof of a wire encircling all of said pans and engaged by the flanges aforesaid whereby those portions of the wire corresponding to the spaces between the pans remain uncovered, and a plate bent to encircle an exposed portion of the wire at one end and provided with a lateral extension at its opposite end extending over the walls of adjoining pans and bent inwardly along its edge to bear against said walls to retain the plate substantially parallel thereto.

5. The combination with a plurality of baking pans, of a frame surrounding said pans and secured thereto to create an outstanding bead at the edges of the walls of said pans, and a series of plates, substantially parallel to the pan walls each of said plates being secured at one end to said frame and having a bead at its opposite end bearing against the adjoining pan walls.

6. The combination with a plurality of spaced baking pans, of flanges formed at the edges of the walls of said baking pans, a wire frame surrounding all of said pans and engaged by the said flanges except at the points corresponding to the spaces between the pans whereby outstanding beads are created at the edges of the pan walls, and a series of plates substantially parallel to the end walls of the pans secured at their upper ends to the exposed portions of the wire frame corresponding to the spaces between the pans and having a bearing means at the opposite ends thereof.

JOSEPH G. JACKSON.